Dec. 24, 1957 E. C. SCHUGELD 2,817,464
SPOUT
Filed Feb. 23, 1955
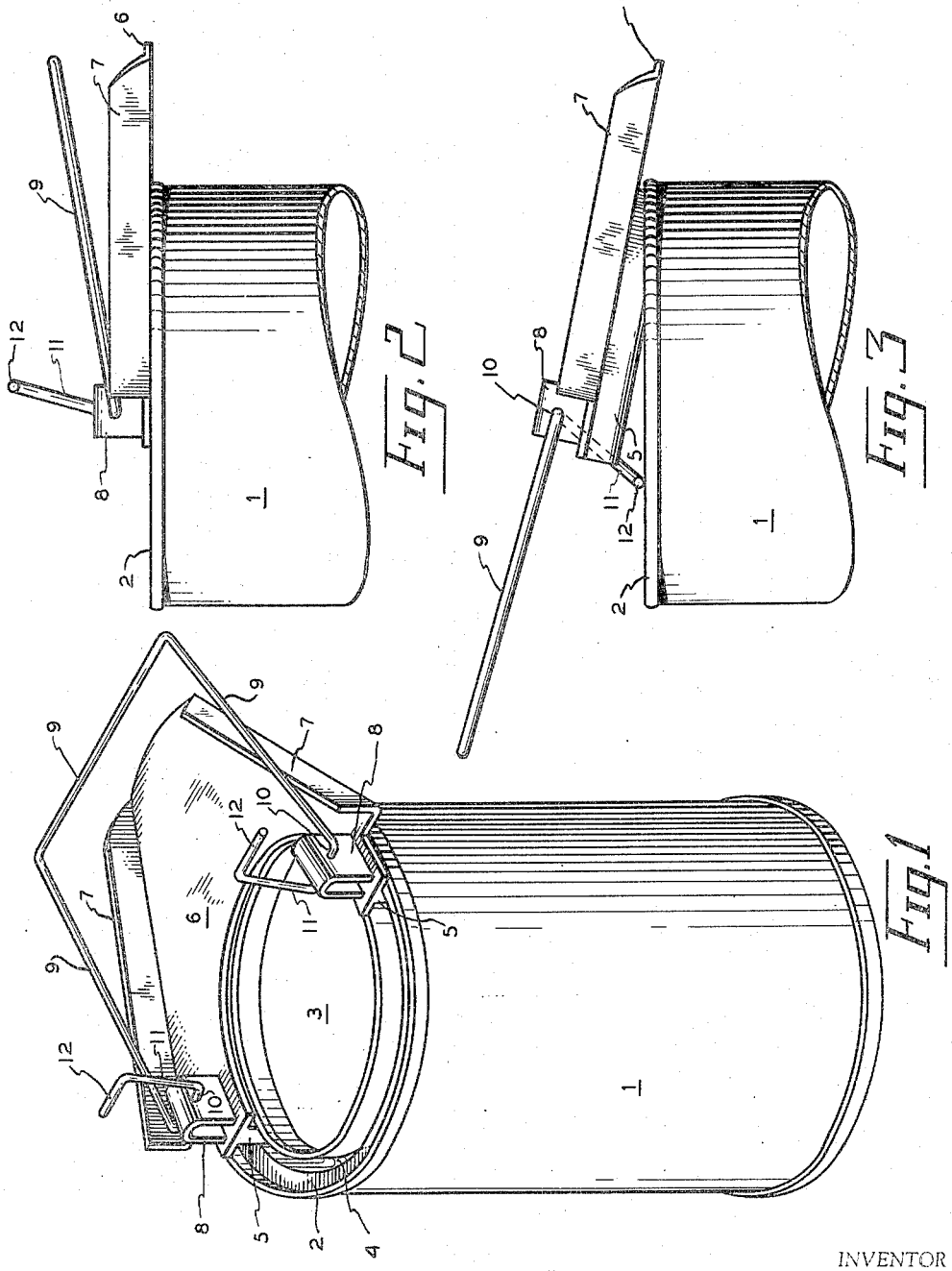
INVENTOR
EDGAR C. SCHUGELD
BY Hyman Hurwitz
ATTORNEY

United States Patent Office 2,817,464
Patented Dec. 24, 1957

2,817,464

SPOUT

Edgar C. Schugeld, Portsmouth, Va.

Application February 23, 1955, Serial No. 489,887

5 Claims. (Cl. 222—465)

The present invention relates generally to spouts for facilitating pouring of contents from containers, and more particularly to spouts which are separable from the containers at will, and which may be separated from the containers, without manual contact with the spouts by actuation of metal bails utilizable as carrying handles for the containers.

Briefly describing a preferred embodiment of the invention, containers for liquids, such as paint, are commonly fabricated of thin sheet metal, and may be cylindrical, having a removable cover secured in and in large part forming their upper ends. The upper ends of such containers normally include an inwardly extending groove, within which extends a complementary flange which is integral with the cover. The cover may be pried from the container in any convenient fashion to open the container, leaving the groove exposed. A spout, provided with a flange similar to the cover flange, may be secured to the container by pressing the spout flange into the groove. In such case it may be difficult to remove the spout from the container without manual contact with the spout, which may serve to transfer paint to the person, and particularly the hands.

In accordance with the present invention the spout is provided with a pair of upwardly extending ears, through which extend the ends of a U-shaped handle, which is utilizable as a carrying handle for the container. The ends of the handle are so formed and disposed as to press against the container top in response to actuation of the handle sufficiently beyond a plane perpendicular with the top of the container, whereby the flange of the spout may be forced out of the groove of the container without manual contact with the spout.

It is, accordingly, an object and feature of the present invention to provide a spout for facilitating pouring the contents of a container, which is engageable with and disengageable from the container, the spout including a carrying handle and a device responsive to suitable actuation of the carrying handle to disengage the spout from the container.

The above and still further objects, features and advantages of the present invention will become evident on consideration of the following detailed disclosure of a specific embodiment thereof, especially when taken in conjunction with the accompanying drawings, wherein:

Figure 1 is a view in perspective of a cylindrical container having a spout engaged with a groove in the upper end wall of the container, the spout having a carrying handle arranged in accordance with the present invention;

Figure 2 is a partial view in side elevation, corresponding with Figure 1; and

Figure 3 is a partial view in side elevation, corresponding generally with Figure 2, and showing the spout in process of removal.

Referring now more particularly to the accompanying drawings, the reference numeral 1 denotes a cylindrical metallic container, such as is commonly employed for paints, and the like. In its upper end 2 is a large circular aperture 3, from which a cover (not shown) has been removed exposing an inwardly extending annular groove 4, which had been employed for securing a complementary annular flange of the cover (not shown).

Secured within the annular groove 4 is a flange 5, occupying less than a complete circle, and which preferably is semi-circular.

Secured to the flange 5, and extending generally in a horizontal plane superposed on the flange 5, is a pouring surface 6 having upstanding side edges 7, which taper toward one another but do not meet. The pouring surface 6 and the wide edges 7 together form a spout. Extending vertically upwardly from the pouring surface 5, at diametrically opposite points, and preferably directly over the flange 5 is a pair of ears 8. A U-shaped wire is bent to form a handle 9 and has ends which extend through suitable apertures 10 in the ears 8, passing from the outside to the inside of the ears 8, and there extending in a short length 11 at an angle of less than 90°, (say 75°) with respect to the handle 9, thereafter extending in a short length 12 parallel to the plane of the handle 9, in a direction outwardly of the container.

The pouring surface 6 is secured to the container 1 by pressing the flange 5 firmly within the groove 4. The handle 9 then is pivotable about the apertures 10 in ears 11, and may be extended vertically to provide a carrying handle. The angle which the wire lengths 11 make with the handle 9 is then such that the wire lengths 11 make no contact with the top wall 2 of the container.

On actuating the handle 9 to a considerably greater angle (Figure 3) the wire lengths 12 are pressed against the top wall 2 of the container 1, forcing the flange 5 out of the groove 4. The spout may, accordingly, be removed from the container 1 without touching the container 1, or the pouring surface 6, and solely by actuation of the handle 9.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What I claim is:

1. A spout for a cylindrical container having an annular inwardly extending groove in an end wall, said spout having a pouring surface, a flange pressable into said annular inwardly extending groove, a pair of upwardly extending diametrically opposed ears secured to said pouring surface, a wire handle subsisting in a plane and pivotably secured to said ears, and means integral with said wire handle for forcing said flange from said groove in response to a predetermined pivotal actuation of said wire handle.

2. The combination in accordance with claim 1 wherein said last means includes at least one length of wire extending at an angle of less than 90° with respect to said plane and an extension of said length of wire extending generally parallel to said predetermined plane.

3. A spout for a cylindrical container having an annular groove in one of its end walls, said spout having a pouring surface extending generally parallel with said end wall, a flange secured to the under side of said pouring surface, said spout being complementary to said annular groove and press-fitting within said annular groove, a handle for said container pivotally secured to said spout, said handle having elements integral with said handle for forcibly ejecting said flange from said groove in response to predetermined actuation of said handle.

4. The combination in accordance with claim 3 wherein said handle is fabricated of a length of wire, wherein is provided a pair of ears located diametrically of said end wall, said handle pivotably secured to said ears.

5. The combination in accordance with claim 4 wherein elements integral with said handle are constituted of wire ends bent into a plane extending at less than 90° with respect to the plane of said handle, and further into a plane extending parallel with the plane of said handle and in directions diametrically outwardly of said container.

References Cited in the file of this patent

UNITED STATES PATENTS 2,145,748     Bailey                 Jan. 31, 1939